(12) United States Patent
Lin

(10) Patent No.: US 8,282,121 B2
(45) Date of Patent: Oct. 9, 2012

(54) GOLF CLUB CART

(76) Inventor: Wen-Tsan Lin, Taichung (TW)

( * ) Notice: Subject to any disclaimer, the term of this patent is extended or adjusted under 35 U.S.C. 154(b) by 307 days.

(21) Appl. No.: 12/822,264

(22) Filed: Jun. 24, 2010

(65) Prior Publication Data

US 2011/0316258 A1 Dec. 29, 2011

(51) Int. Cl.
*B62B 3/02* (2006.01)
(52) U.S. Cl. .......... 280/651; 280/47.34; 280/DIG. 6
(58) Field of Classification Search .......... 280/35, 280/38, 41.17, 43.1, 47.131, 47.17, 47.23, 280/47.26, 79.5, 638, 639, 651, DIG. 6; 206/315.2
See application file for complete search history.

(56) References Cited

U.S. PATENT DOCUMENTS

| | | | | |
|---|---|---|---|---|
| 4,356,875 A | * | 11/1982 | Clune | 180/13 |
| 4,784,401 A | * | 11/1988 | Raguet | 280/40 |
| 7,581,748 B2 | * | 9/2009 | Reimers | 280/651 |
| 7,862,053 B2 | * | 1/2011 | Liao | 280/47.34 |
| 2003/0222428 A1 | * | 12/2003 | Shieh | 280/651 |
| 2007/0096415 A1 | * | 5/2007 | Reimers | 280/47.131 |
| 2009/0295130 A1 | * | 12/2009 | Liao | 280/651 |
| 2010/0052275 A1 | * | 3/2010 | Reimers et al. | 280/47.26 |
| 2010/0059948 A1 | * | 3/2010 | Liao | 280/42 |
| 2010/0225093 A1 | * | 9/2010 | Lin | 280/642 |
| 2011/0241314 A1 | * | 10/2011 | Liao | 280/651 |

* cited by examiner

*Primary Examiner* — Katy M Ebner
*Assistant Examiner* — Emma K Frick
(74) *Attorney, Agent, or Firm* — Chun-Ming Shih

(57) ABSTRACT

A foldable cart for transporting golf clubs includes a main frame, a joint unit, a handle frame, two supporting frames, a club holder, a front wheel, two rear wheels, an auxiliary frame unit and a linking rod. The joint unit has four joints, each of which includes a first, second and third lock. When the first lock is released, the handle frame may be folded towards the main frame. When the third lock is released, the front wheel and fork may be turned over. When the second lock is released, one of the joints is moved upwards and pushes the linking rod and two supporting rods to make the front wheel, front fork, two auxiliary supports and two rear wheels folded towards the main frame.

10 Claims, 8 Drawing Sheets

GOLF CLUB CART

BACKGROUND OF THE INVENTION

1. Technical Field

The invention generally relates to golf, particularly to cart for transporting golf clubs.

2. Related Art

With increase of standard of living, golf has become popular. Thus, golfers are not only nobles or the upper class any longer. In modern society, the general public also plays golf universally.

Golfing requires various clubs. In professional golf games, golf clubs are usually transported by electric golf trolleys or caddies. For non-professional golfers, however, they still need to carry their clubs by themselves.

Conventional golf club carts can provide a function of transporting clubs, but they are not convenient to be used because they are not foldable.

SUMMARY OF THE INVENTION

An object of the invention is to provide a golf club cart which can be rapidly folded for easy carrying and storage.

The golf club cart includes a main frame, a joint unit, a handle frame, two supporting frames, a club holder, a front wheel, two rear wheels, an auxiliary frame unit and a linking rod.

Accordingly, the invention provides a golf club cart including a main frame, a joint unit, a handle frame, two supporting frames, a club holder, a front wheel, two rear wheels, an auxiliary frame unit and a linking rod. The main frame has an upper end and a lower end. The joint unit has a first joint, a second joint, a third joint and a fourth joint, wherein the first joint, the second joint and the third joint have a first lock, a second lock and a third lock, respectively. The first joint connects to the upper end of the main frame and the second joint connects to the lower end of the main frame, and the fourth joint is movably ringed on a middle of the main frame. The handle frame connects to the first joint to be located on the main frame, wherein the handle frame can be swayed between a use position and a fold position by the first joint. The two supporting frames, being parallel, each has an upper end and a lower end, wherein the upper ends of the supporting frames pivotally connect to the first joint to be located below the main frame. The club holder has an upper fastener, two lower fasteners and a carriage, wherein the upper fastener and the lower fasteners are mounted on the handle frame and on the lower ends of the supporting frames, respectively, and the carriage links the lower fastener to be below the lower fastener. The front wheel rotarily connected to the third joint by a front fork. The auxiliary frame unit has two auxiliary supports, a pivot, two supporting rods and a rope, wherein the pivot is pivoted between the second joint and the fourth joint, each of the auxiliary supports has an upper end connecting to the pivot and a lower end connecting to the rear wheels, the supporting rods symmetrically connect between the fourth joint and the auxiliary supports, two ends of the rope separately connect between distal ends of the supporting rods, and the two supporting rods and the rope form a triangular fulcrum to suspend the auxiliary supports. The linking rod connects between the third joint and the fourth joint.

When the first lock is released, the handle frame may be folded towards the main frame. When the third lock is released, the front wheel and fork may be turned over. When the second lock is released, one of the joints is moved upwards and pushes the linking rod and two supporting rods to make the front wheel, the front fork, the auxiliary supports and the two rear wheels folded towards the main frame.

The invention further comprises a storage body mounted on the handle frame, wherein the storage body is provided with a box, a cup holder and a round recess.

The invention further comprises a brake unit, wherein the brake unit includes a brake handle mounted on one side of the handle frame, a brake disc axially fixed on a spindle of the rear wheels, a brake rod and a brake cable connecting between the brake rod and the brake handle.

The invention further comprises an umbrella holder mounted on the handle frame by a fastener knob.

According to the invention, wherein the first joint further comprises a first sleeve, a second sleeve and a third sleeve, the latter two of which are rotary, the handle frame is substantially U-shaped, two ends of the handle frame separately connect to the second sleeve and the third sleeve of the first joint.

According to the invention, wherein the second joint further comprises a first sleeve, a second sleeve and a third sleeve, the latter two of which are rotary, the lower end of the main frame connects to the first sleeve of the second joint, the upper ends of the supporting frames separately connect to the second sleeve and the third sleeve of the second joint.

According to the invention, wherein the third joint further comprises a first sleeve, a second sleeve and a third sleeve, the latter two of which are rotary, each of the lower fasteners of the club holder includes an upper sleeve, an axial sleeve, two detachable protectors and a set of straps tied on the detachable protectors, the axial sleeves of the lower fasteners connect to the second sleeve and the third sleeve of the third joint, and the lower ends of the supporting frames separately connect to the upper sleeves of the lower fasteners.

According to the invention, wherein the fourth joint further comprises a shaft and two pivoting points, the upper end of the linking rod is pivotally connected to the shaft of the fourth joint 24, and upper ends of the supporting rods separately connect to the pivoting points of the fourth joint.

According to the invention, wherein the handle frame is substantially U-shaped, and the upper fastener further comprises two detachable protectors tied on the handle frame and a set of straps.

According to the invention, wherein the set of straps are composed of a pair of Velcro.

In comparison with traditional golf carts, the invention utilizes three joints to generate foldability. This makes users convenient to carry or store. And, after folding, the golf club cart can be fastened by locking the three joints for being easy to carry.

DETAILED DESCRIPTION OF THE INVENTION

The golf club cart of the invention utilizes three joints to make foldability. The folded cart is advantageous to carrying and storage.

Figure 1:
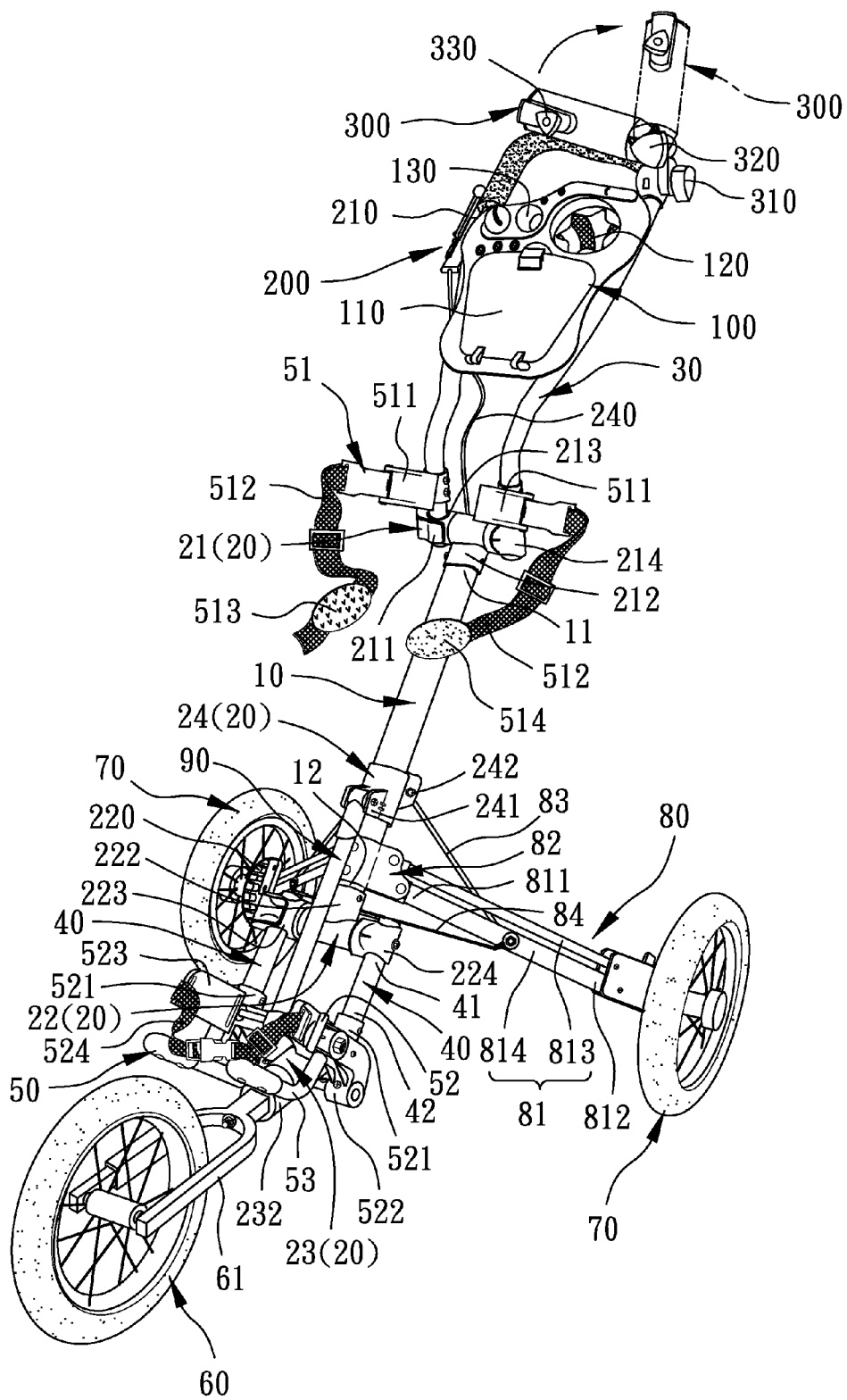
FIG. 1 is a perspective view of a preferred embodiment of the golf club cart of the invention.
Figure 2:
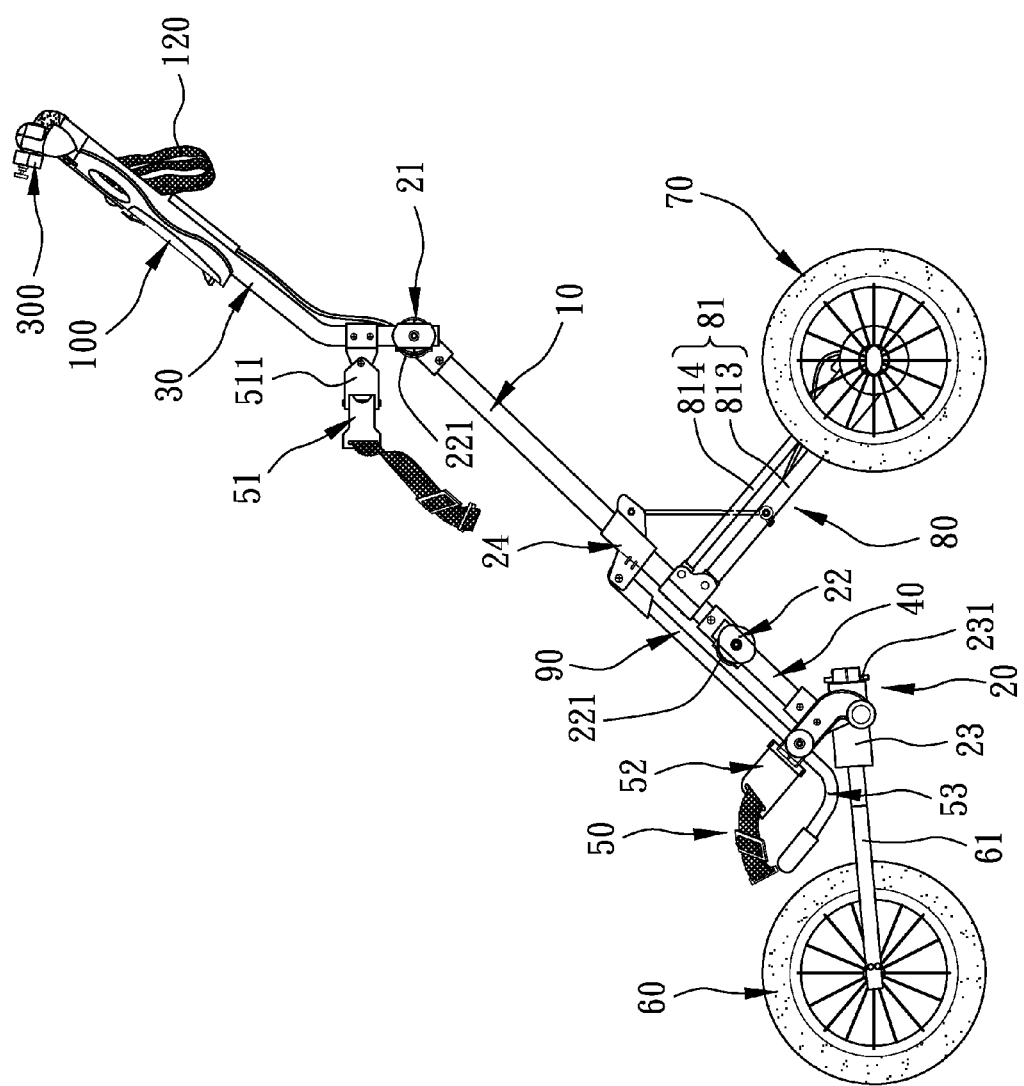
FIG. 2 is a side view of the golf club cart in expanded status.

FIGS. 1 and 2 show a preferred embodiment of the invention. The golf club cart includes a main frame 10, a joint unit 20, a handle frame 30, two supporting frames 40, a club holder 50, a front wheel 60, two rear wheels 70, an auxiliary frame unit 80 and a linking rod 90.

The main frame 10 has an upper end 11 and a lower end 12.

The joint unit 20 has a first joint 21, a second joint 22, a third joint 23 and a fourth joint 24. The first joint 21, second joint 22 and third joint 23 have a first lock 211, a second lock 221 and a third lock 231, respectively. The first joint 21 connects to the upper end 11 of the main frame 10 and the second joint 22 connects to the lower end 12 of the main frame 10. The fourth joint 24 is movably ringed on the middle of the main frame 10.

Figure 4:
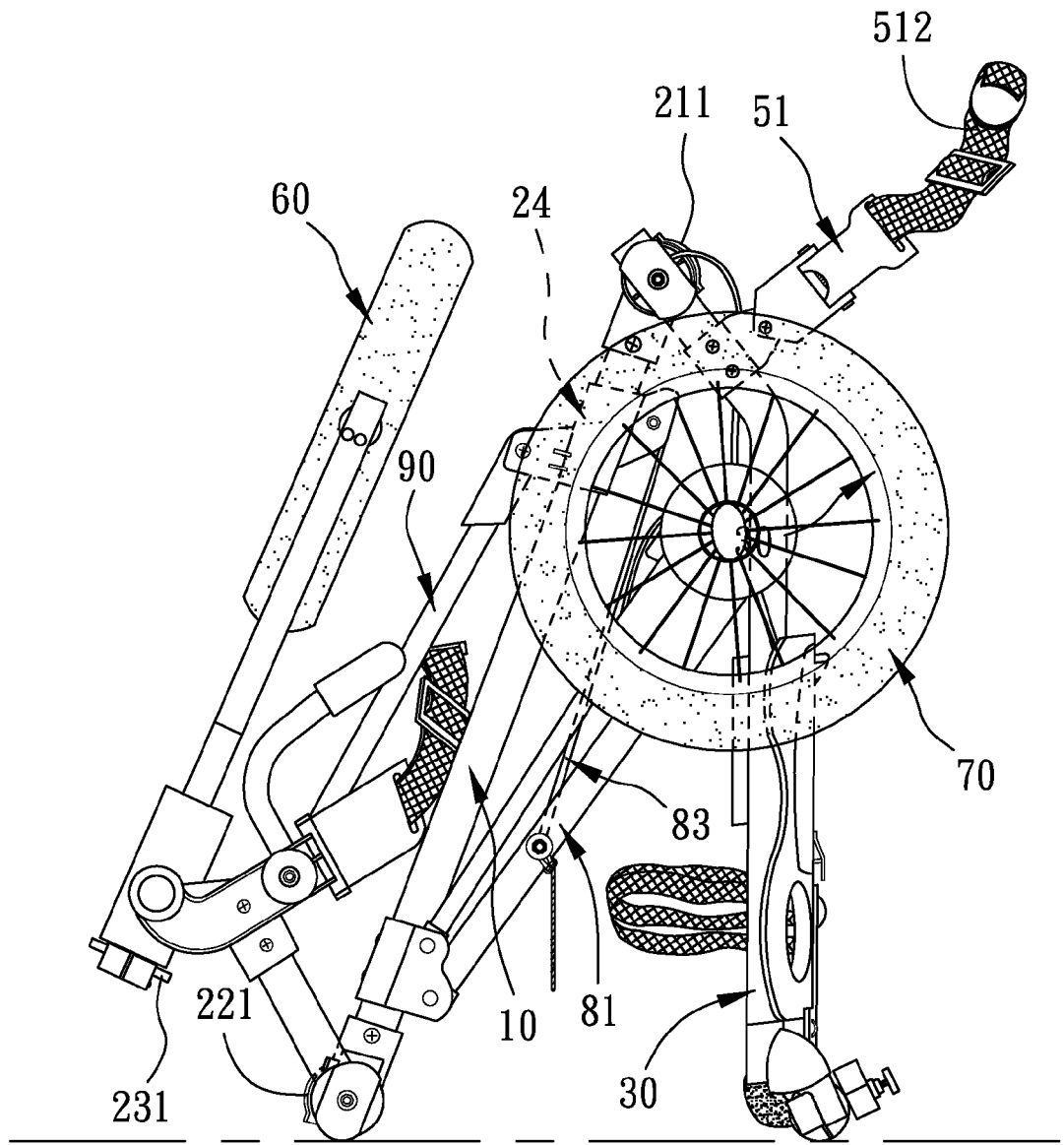
FIG. 4 is a side view of the golf club cart in folded status.

The handle frame 30, which is substantially U-shaped, connects to the first joint 21 to be located on the main frame 10. The handle frame 30 can be swayed between a use position (as shown in FIG. 2) and a fold position (as shown in FIG. 4) by the first joint 21.

Each of the supporting frames 40 has an upper end 41 and a lower end 42. The supporting frames 40 are parallel and the upper ends 41 thereof pivotally connect to the first joint 21 to be located below the main frame 10.

Figure 5:
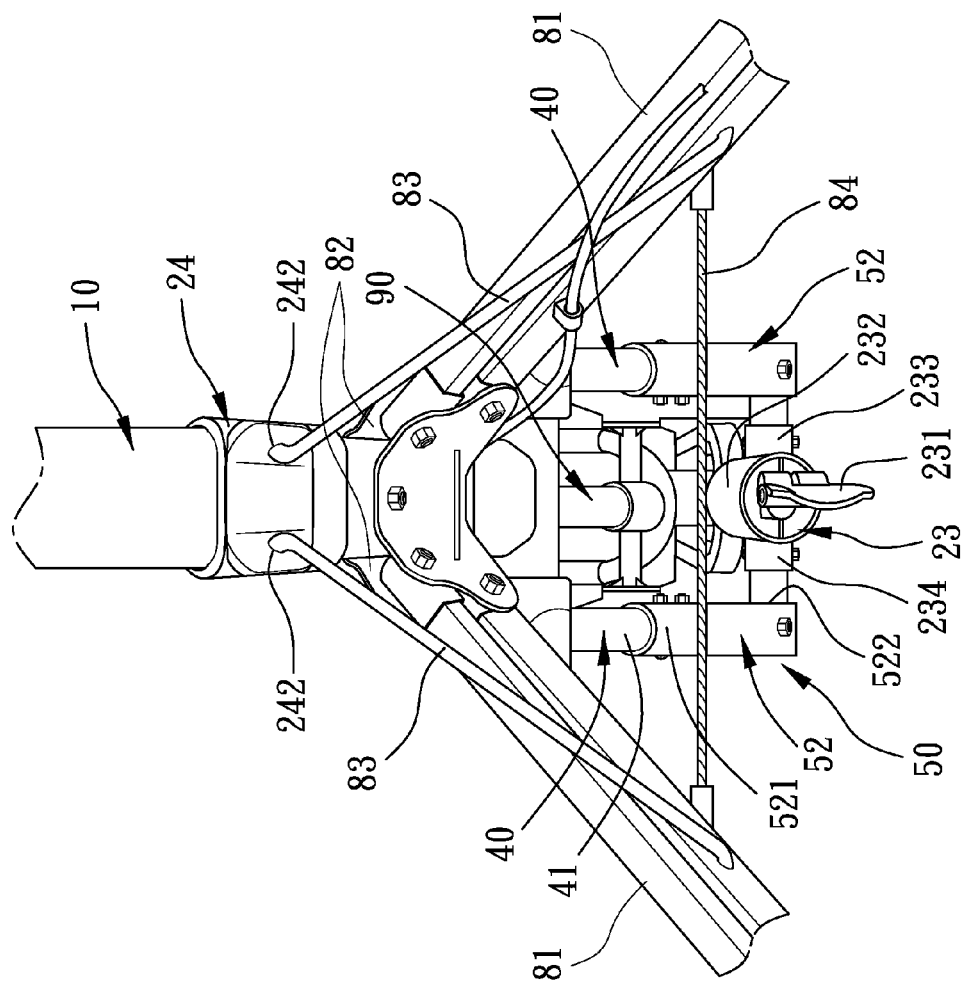
FIG. 5 is a partially rear view of the golf club cart.

Referring to FIG. 5, the club holder 50 is provided with an upper fastener 51, a lower fastener 52 and a carriage 53. The upper fastener 51 and lower fastener 52 are mounted on the handle frame 30 and on the lower ends 42 of the supporting frames 40, respectively. The carriage 53 links the lower fastener 52 and is below the lower fastener 52. The upper fastener 51 includes two detachable protectors 511 tied on the handle frame 30 and a set of straps 512 composed of a pair of Velcro 513, 514.

The front wheel 60 is rotarily connected to the third joint 23 by a front fork 61.

The auxiliary frame unit 80 is composed of two auxiliary supports 81, a pivot 82, two supporting rods 83 and a rope 84. The pivot 82 is pivoted between the second joint 22 and fourth joint 24. Each of the auxiliary supports 81 has an upper end 811 connecting to the pivot 82 and a lower end 812 connecting to the rear wheels 70. The supporting rods 83 symmetrically connect between the fourth joint 24 and auxiliary supports 81. Two ends of the rope 84 separately connect between distal ends of the supporting rods 83. The two supporting rods 83 and the rope 84 form a triangular fulcrum to suspend the auxiliary supports 81. The auxiliary supports 81 further include a first assistant support 813 and a second assistant support 814.

The linking rod 90 connects between the third joint 23 and fourth joint 24.

Besides, the first joint 21 of the joint unit 20 further includes a first sleeve 212, a second sleeve 213 and a third sleeve 214, the latter two of which are rotary. Two ends of the handle frame 30 separately connect to the second sleeve 213 and the third sleeve 214 of the first joint 21.

The second joint 22 of the joint unit 20 further includes a first sleeve 222, a second sleeve 223 and a third sleeve 224, the latter two of which are rotary. The lower end 12 of the main frame 10 connects to the first sleeve 222 of the second joint 22. The upper ends 41 of the supporting frames 40 separately connect to the second sleeve 223 and the third sleeve 224 of the second joint 22.

Referring to FIGS. 1 and 5, the third joint 23 of the joint unit 20 further includes a first sleeve 232, a second sleeve 233 and a third sleeve 234, the latter two of which are rotary. Each of the lower fasteners 52 of the club holder 50 includes an upper sleeve 521, an axial sleeve 522, two detachable protectors 523 and a set of straps 524 tied on the detachable protectors 523. The axial sleeves 522 of the lower fasteners 52 separately connect to the second sleeve 233 and the third sleeve 234 of the third joint 23. The lower ends 41 of the supporting frames 40 separately connect to the upper sleeves 521 of the lower fasteners.

Still referring to FIGS. 1 and 5, the fourth joint 24 of the joint unit 20 includes a shaft 241 and two pivoting points 242. The upper end of the linking rod 90 is pivotally connected to the shaft 241 of the fourth joint 24. The upper ends of the supporting rods 83 separately connect to the pivoting points 242 of the fourth joint 24.

The golf club cart of the invention further includes a storage body 100, a brake unit 200 and an umbrella holder 300.

Figure 10:
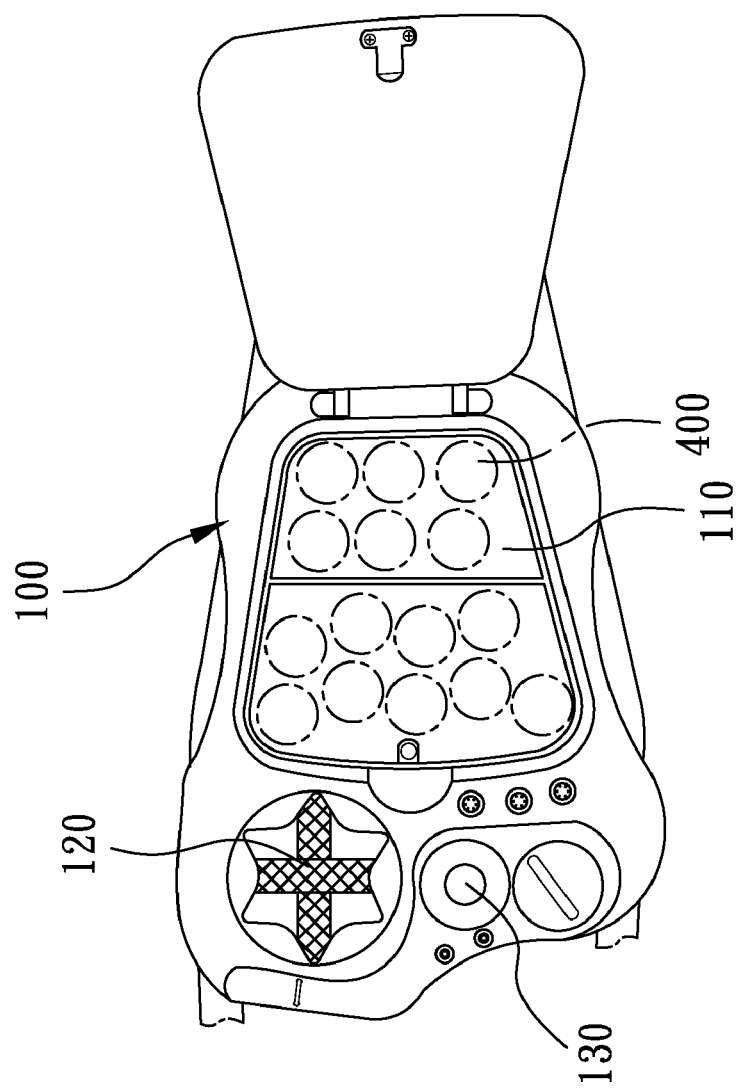
FIG. 10 is a planar view of the storage body.

Referring to FIG. 10, the storage body 100 is mounted on the handle frame 30. The storage body 100 is provided with a box 100 for accommodating golf balls 400, a cup holder 120 and a round recess 130 for temporarily placing the golf balls 400.

Figure 7:
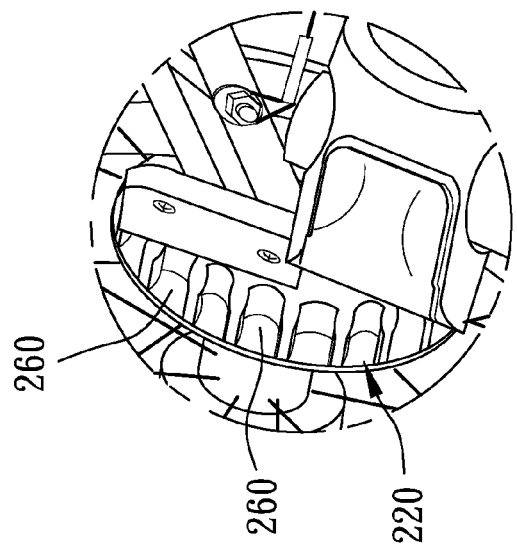
FIG. 7 shows the brake disc of the brake unit.
Figure 6:
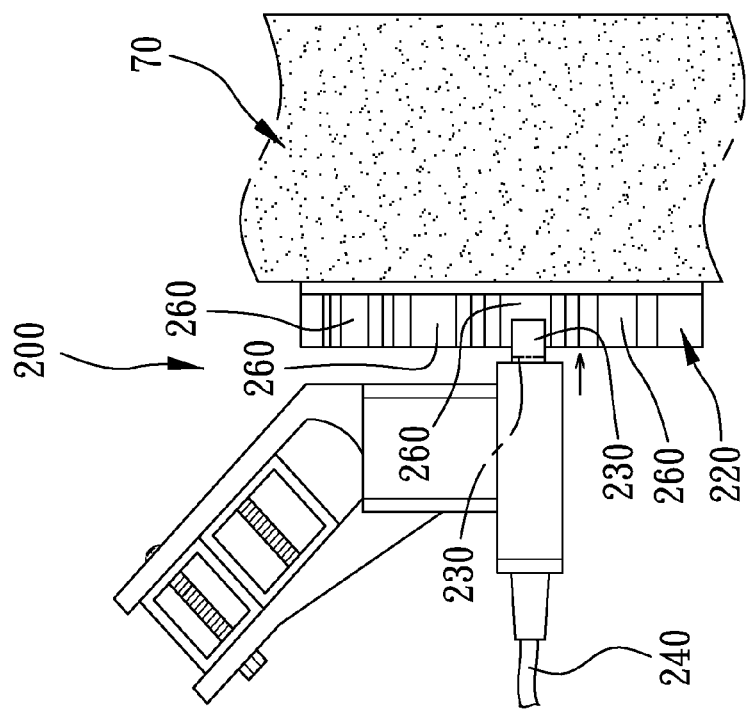
FIG. 6 shows the brake rod of the brake unit in braking status.
Figure 9:
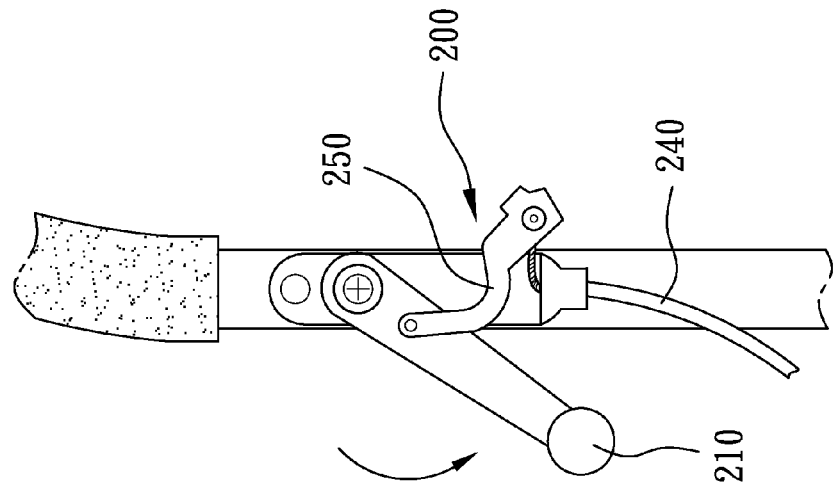
FIG. 9 shows the brake handle of the brake unit in braking status.
Figure 8:
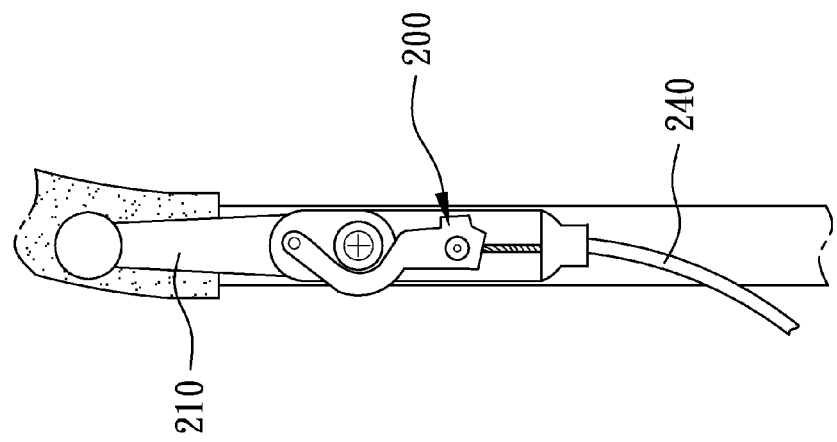
FIG. 8 shows the brake handle of the brake unit in initial status.

Referring to FIGS. 6-8, the brake unit 200 includes a brake handle 210 mounted on one side of the handle frame 30, a brake disc 220 axially fixed on a spindle of the rear wheels 70, a brake rod 230 and a brake cable 240 connecting between the brake rod 230 and the brake handle 210. Besides, the brake disc 220 is provided with a plurality of holes 260. Further referring to FIG. 9, when a user operates the brake handle 210, the brake handle 210 draws the brake cable 240 to push the brake rod 230 to penetrate into one of the holes 260 so that the rear wheels 70 is braked. When the brake handle 210 is released to the original position as shown in FIG. 8, the brake rod 230 immediately retracts from the hole 260 as shown in FIG. 6, so that the rear wheels 70 are restored to be rotary.

The umbrella holder 300 is mounted on the handle frame 30 by a fastener knob 310 and can be moved by another fastener knob 320. When the fastener knob 320 is loosened, the umbrella holder 300 can be moved upwards for being embedded by an umbrella. The umbrella in the umbrella holder 300 can be gripped by tightening another fastener knob 330.

Figure 3:
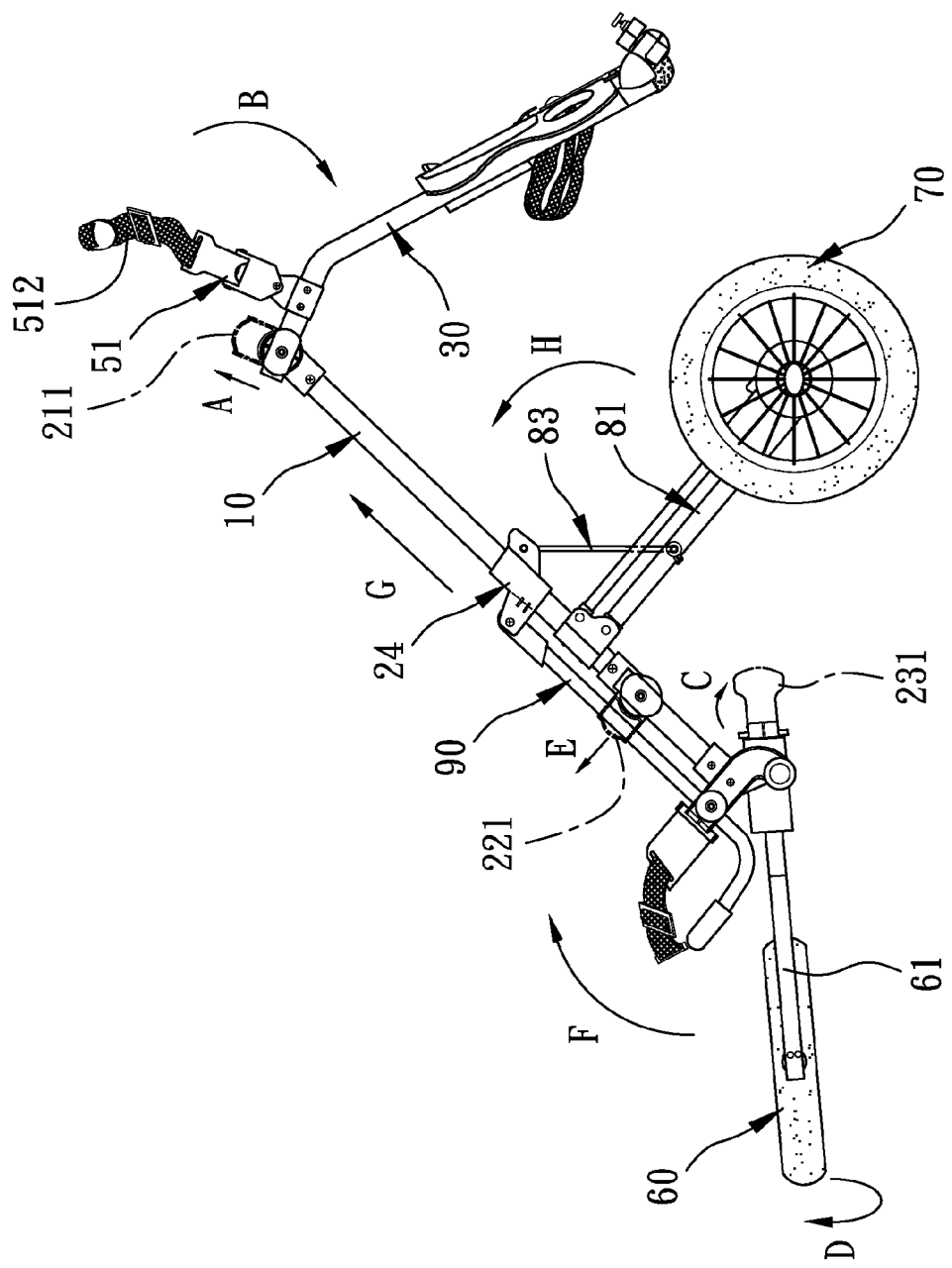
FIG. 3 is a side view of the golf club cart in semi-folded status.

Referring to FIGS. 3 and 4, when folding the golf club cart, first, the first lock 211 must be loosened as shown by arrow A and the handle frame 30 is folded towards the main frame 10 as shown by arrow B. Then, loosen the third lock 231 as shown by arrow C and turn the front fork 61 with the front wheel 60 over as shown by arrow D. Finally, loosen the second lock 221 as shown by arrow E and fold the front fork 61 with the front wheel 60 upwards along the main frame 10 as shown by arrow F and move the fourth joint 24 upwards along the main frame 10 as shown by arrow G. At this time, the fourth joint 24 also drives the linking rod 90 and the two supporting rods 83 to make the front fork 61, front wheel 60, two auxiliary supports 81 and two rear wheels 70 folded towards the main frame 10 as shown by arrow H. The folding process is completed. To avoid undesired loosening of the folded cart, flick the first, second and third lock 211, 221, 231 to a locking position as shown in FIG. 4.

When carrying the golf club cart, a user may grip the straps 512 of the upper fastener 51 to take the cart up.

As abovementioned, the golf club cart of the invention utilizes the first joint 21, the second joint 22 and the third joint 23 to pivotally connect frames, so that the cart can be expanded or folded. The folded cart is easy to be stored in a car for transportation. Besides, the three locks 211, 221, 231 can perform a locking function whether the cart is expanded or folded. This will enhance safety when carrying.

While the forgoing is directed to a preferred embodiment of the present invention, other and further embodiments of the invention may be devised without departing from the basic scope thereof. As such, the appropriate scope of the invention is to be determined according to the claims.

What is claimed is:

1. A golf club cart comprising:
a main frame having an upper end and a lower end;
a joint unit having a first joint, a second joint, a third joint and a fourth joint, wherein the first joint, the second joint and the third joint have a first lock, a second lock and a third lock, respectively, the first joint connects to the upper end of the main frame and the second joint connects to the lower end of the main frame, and the fourth joint is movably ringed on a middle of the main frame;
a handle frame, connecting to the first joint to be located on the main frame, wherein the handle frame can be swayed between a use position and a fold position by the first joint;
two supporting frames, being parallel, each having an upper end and a lower end, wherein the upper ends of the supporting frames pivotally connect to the first joint to be located below the main frame;
a club holder having an upper fastener, two lower fasteners and a carriage, wherein the upper fastener and the lower fasteners are mounted on the handle frame and on the lower ends of the supporting frames, respectively, and the carriage links the lower fastener to be below the lower fastener;
a front wheel rotarily connected to the third joint by a front fork;
two rear wheels;
an auxiliary frame unit, having two auxiliary supports, a pivot, two supporting rods and a rope, wherein the pivot is pivoted between the second joint and the fourth joint, each of the auxiliary supports has an upper end connecting to the pivot and a lower end connecting to the rear wheels, the supporting rods symmetrically connect between the fourth joint and the auxiliary supports, two ends of the rope separately connect between distal ends of the supporting rods, and the two supporting rods and the rope form a triangular fulcrum to suspend the auxiliary supports; and
a linking rod connecting between the third joint and the fourth joint;
thereby when the first lock is released, the handle frame may be folded towards the main frame; when the third lock is released, the front wheel and the front fork may be turned over; when the second lock is released, the fourth joint may be moved upwards and pushes the linking rod and two supporting rods to make the front wheel, the front fork, the auxiliary supports and the rear wheels folded towards the main frame.

2. The cart of claim 1, further comprising a storage body mounted on the handle frame, wherein the storage body is provided with a box, a cup holder and a round recess.

3. The cart of claim 1, further comprising a brake unit, wherein the brake unit includes a brake handle mounted on one side of the handle frame, a brake disc axially fixed on a spindle of the rear wheels, a brake rod and a brake cable connecting between the brake rod and the brake handle.

4. The cart of claim 1, further comprising an umbrella holder mounted on the handle frame by a fastener knob.

5. The cart of claim 1, wherein the first joint further comprises a first sleeve, a second sleeve and a third sleeve, the latter two of which are rotary, the handle frame is substantially U-shaped, two ends of the handle frame separately connect to the second sleeve and the third sleeve of the first joint.

6. The cart of claim 1, wherein the second joint further comprises a first sleeve, a second sleeve and a third sleeve, the latter two of which are rotary, the lower end of the main frame connects to the first sleeve of the second joint, the upper ends of the supporting frames separately connect to the second sleeve and the third sleeve of the second joint.

7. The cart of claim 1, wherein the third joint further comprises a first sleeve, a second sleeve and a third sleeve, the latter two of which are rotary, each of the lower fasteners of the club holder includes an upper sleeve, an axial sleeve, two detachable protectors and a set of straps tied on the detachable protectors, the axial sleeves of the lower fasteners connect to the second sleeve and the third sleeve of the third joint, and the lower ends of the supporting frames separately connect to the upper sleeves of the lower fasteners.

8. The cart of claim 1, wherein the fourth joint further comprises a shaft and two pivoting points, the upper end of the linking rod is pivotally connected to the shaft of the fourth joint, and upper ends of the supporting rods separately connect to the pivoting points of the fourth joint.

9. The cart of claim 1, wherein the handle frame is substantially U-shaped, and the upper fastener further comprises two detachable protectors tied on the handle frame and a set of straps.

10. The cart of claim 9, wherein the set of straps are composed of a pair of hook and loop fasteners straps.

* * * * *